(12) United States Patent
Kurtz et al.

(10) Patent No.: US 8,044,472 B2
(45) Date of Patent: Oct. 25, 2011

(54) NANOTUBE AND GRAPHENE SEMICONDUCTOR STRUCTURES WITH VARYING ELECTRICAL PROPERTIES

(75) Inventors: Anthony D. Kurtz, Saddle River, NJ (US); Adam Hurst, Slate Hill, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 72 days.

(21) Appl. No.: 12/692,267

(22) Filed: Jan. 22, 2010

(65) Prior Publication Data

US 2010/0140723 A1   Jun. 10, 2010

Related U.S. Application Data

(63) Continuation-in-part of application No. 10/396,176, filed on Mar. 25, 2003, now abandoned.

(51) Int. Cl.
*H01L 29/84* (2006.01)
(52) U.S. Cl. ............. 257/418; 257/77; 257/415
(58) Field of Classification Search .......... 257/418, 257/77, 415
See application file for complete search history.

(56) References Cited

U.S. PATENT DOCUMENTS

| | | | |
|---|---|---|---|
| 4,814,856 A | 3/1989 | Kurtz et al. | |
| 5,376,241 A | 12/1994 | Shor et al. | |
| 5,376,818 A * | 12/1994 | Kurtz | 257/418 |
| 5,569,626 A | 10/1996 | Kurtz et al. | |
| 5,834,378 A | 11/1998 | Kurtz et al. | |
| 5,939,732 A * | 8/1999 | Kurtz et al. | 257/77 |
| 6,286,226 B1 | 9/2001 | Jin | |
| 6,465,132 B1 | 10/2002 | Jin | |
| 6,803,840 B2 | 10/2004 | Hunt et al. | |
| 6,894,359 B2 | 5/2005 | Bradley et al. | |
| 7,313,096 B2 * | 12/2007 | Kocalar et al. | 370/241 |
| 2006/0253942 A1 | 11/2006 | Barrera et al. | |
| 2007/0138010 A1 | 6/2007 | Ajayan | |

FOREIGN PATENT DOCUMENTS

GB   2145284   3/1985

OTHER PUBLICATIONS

Kong, et al; "Synthesis of Individual Single-Walled Carbon Nanotubes on Patterned Silicon Wafers;" Nature (395); Oct. 29, 1998; pp. 878-881.

(Continued)

*Primary Examiner* — Long Pham
(74) *Attorney, Agent, or Firm* — Truotman Sanders LLP; James E. Schutz; Jihan A. R. Jenkins (57) ABSTRACT

Nanotube and graphene transducers are disclosed. A transducer according to the present invention can include a substrate, a plurality of semiconductive structures, one or more metal pads, and a circuit. The semiconductive structures can be nanotubes or graphene located entirely on a surface of the substrate, such that each of the semiconductive structures is supported along its entire length by the substrate. An electrical property of the semiconductive structures can change when a force is applied to the substrate. The metal pads can secure at least one of the semiconductive structures to the substrate. The circuit can be coupled to at least some of the semiconductive structures to provide an output responsive to the change in the electrical property of the semiconductive structures, so as to indicate the applied force.

14 Claims, 9 Drawing Sheets

OTHER PUBLICATIONS

Minot et al.; "Tuning Carbon Nanotube Band Gaps with Strain;" Physical Review Letters, The American Physical Society; vol. 90, No. 15; Apr. 18, 2003; pp. 156401-1 through 156401-4.

Kane et al.; "Size, Shape and Low Energy Electronic Structure of Carbon Nanotubes;" Physical Review Letters, The American Physical Society; vol. 78, No. 10; Mar. 10, 1997; pp. 1932-1935.

Heyd et al.; "Uniaxial-stress Effects on the Electronic Properties of Carbon Nanotubes;" Physical Review B, The American Physical Society; vol. 55, No. 11; Mar. 15, 1997; pp. 6820-6824.

Yang et al.; "Band-gap Change of Carbon Nanotubes: Effect of Small Uniaxial and Torsional Strain;" Physical Review B, The American Physical Society; vol. 60, No. 19; Nov. 15, 1999; pp. 13874-13878.

Yang et al.; "Electronic Structure of Deformed Carbon Nanotubes;" Physical Review Letters, The American Physical Society; vol. 85, No. 1; Jul. 3, 2000; pp. 154-157.

Maiti et al; "Electronic Transport Through Carbon Nanotubes: Effects of Structural Deformation and Tube Chirality;" Physical Review Letters, The American Physical Society; vol. 88, No. 12; Mar. 25, 2002; pp. 126805-1 through 126805-4.

Salvetat et al.; "Elastic and Shear Moduli of Single-Walled Carbon Nanotube Ropes;" Physical Review Letters, The American Physical Society; vol. 82, No. 5; Feb. 1, 1999; pp. 944-947.

Yakobson et al.; "Nanomechanics of Carbon Tubes: Instabilities Beyond Linear Response;" Physical Review Letters, The American Physical Society; vol. 76, No. 14; Apr. 1, 1996; pp. 2511-2514.

Xin, et al.; "Strain Energy and Young's Modulus of Single-Wall Carbon Nanotubes Calculated from Electronic Energy-Band Theory;" Physical Review B, The American Physical Society; vol. 62, No. 20; Nov. 15, 2000; pp. 13692-13696.

Lu; "Elastic Properties of Carbon Naotubes and Nanoropes;" Physical Review Letters, The American Physical Society; vol. 79, No. 7; Aug. 18, 1977; pp. 1297-1300.

Bachtold et al.; "Scanned Probe Microscopy of Electronic Transport in Carbon Nanotubes;" Physical Review Letters, The American Physical Society; vol. 84, No. 25; Jun. 26, 2000; pp. 6082-6085.

Leonard et al.; "Novel Length Scales in Nanotube Devices;" Physical Review Letters, The American Physical Society; vol. 83, No. 24; Dec. 13, 1999; pp. 5174-5177.

Odintsov; "Schottky Barriers in Carbon Nanotube Heterojunctions;" Physical Review Letters, The American Physical Society; vol. 85, No. 1; Jul. 3, 2000; pp. 150-153.

Salvetat, et al.; "Mechanical Properties of Carbon Nanotubes;" Applied Physics A; 69; 1999; pp. 255-260.

Paulson et al.; "In Situ Resistance Measurements of Strained Carbon Nanotubes;" Applied Physicals letters; vol. 75, No. 19; Nov. 8, 1999; pp. 2936-2938.

Walters, et al.; "Elastic Strain of Freely Suspended Single-Wall Carbon Nanotube Ropes;" Applied Physics Letters; vol. 74, No. 25; Jun. 21, 1999; pp. 3803-3805.

Nygard, et al.; "Quantum Dots in Suspended Single-Wall Carbon Nanotubes;" Applied Physics Letters; vol. 79, No. 25; Dec. 17, 2001; pp. 4216-4218.

Franklin, et al.; "Integration of Suspended Carbon Nanotube Arrays into Electronic Devices and Electromechanical Systems;" Applied Physics Letters; vol. 81, No. 5; Jul. 29, 2002; pp. 913-915.

Park et al.; "Electrical Cutting and Nicking of Carbon Nanotubes Using an Atomic Force Microscope;" Applied Physics Letters; vol. 80, No. 23; Jun. 10, 2002; pp. 4446-4448.

Park, et al.; "Formation of a p-type Quantum Dot at the End of an n-type Carbon Nanotube;" Applied Physics Letters; vol. 79, No. 9; Aug. 27, 2001; pp. 1363-1365.

Rosenblatt, et al.; "High Performance Electrolyte Gated Carbon Nanotube Transistors;" Nano Letters; vol. 2, No. 8, 2002; pp. 869-872.

Odom et al.; "Atomic Structure and Electronic Properties of Single-Walled Carbon Nanotubes;" Letters to Nature, Nature 391; 1998; pp. 62-64.

Wilder et al.; "Electronic Structure of Atomically Resolved Carbon Nanotubes;" Letters to Nature, Nature 391; 1998; pp. 59-62.

Tombler et al.; "Reversible Electromechanical Characteristics of Carbon Nanotubes Under Local-Probe Manipulation;" Letters to Nature, Nature 405; 2000; pp. 769-772.

White et al.; "Density of States Reflects Diameter in Nanotubes;" Scientific Correspondence, Nature 394; 1998; pp. 29-30.

Yu, et al.; "Strength and Breaking Mechanism of Multiwalled Carbon Nanotubes Under Tensile Load;": Science; vol. 287; Jan. 28, 2000; pp. 637-640.

Rochefort, et al.; "The Effect of Structural Distortions on the Electronic Structure of Carbon Nanotubes;" Chemical Physics letters; Elsevier; Nov. 20, 1998; pp. 45-50.

Hutter, et al.; "Calibration of Atomic-Force Mciroscope Tips;" Rev. Sci. Instrum. 64 (7); Jul. 1993; pp. 1868-1873.

Decossas, et al.; "Interaction Forces Between Carbon Nanotubes and an AFM Tip;" Europhysics Letters, Europhys. Lett. 53 (6); 2001; pp. 742-748.

* cited by examiner

NANOTUBE AND GRAPHENE SEMICONDUCTOR STRUCTURES WITH VARYING ELECTRICAL PROPERTIES

CROSS-REFERENCE TO RELATED APPLICATIONS

This application is a continuation-in-part of U.S. patent application Ser. No. 10/396,176, filed 25 Mar. 2003, the contents and substance of which are incorporated by reference as if fully set forth below.

TECHNICAL FIELD

This invention relates to nanotube and graphene structures and, more particularly, to solid state nanotube and graphene structures that change their electrical properties under the application of forces or various external conditions.

BACKGROUND

It has long been known that a plurality of nanocrystallites in silicon carbide (SiC) would give rise to an enlargement of the energy gap of the SiC shifting any emitted light towards the ultraviolet (UV) region because of quantum confinement, which allows the relaxation of momentum selection rules by confining the charge carriers spatially, thus allowing direct band gap transitions. See U.S. Pat. No. 5,376,241 to Kurtz, entitled "Fabricating Porous Silicon Carbide," which issued on 27 Dec. 1994 and is assigned to Kulite Semiconductor Products, Inc, the assignee herein. That patent teaches the formation of porous SiC, which is formed under electrochemical anodization. The patent also describes the production of the semiconductor through the use of UV light to illuminate the surface of the semiconductor. In this manner, by controlling the light intensity, the potential, and the doping level, a porous layer is formed in the semiconductor, thereby producing porous SiC. The porous SiC can be employed for UV light sources, such as LEDs and diode lasers. Porous SiC can also be utilized as a filtering chemical process to provide heterojunction devices.

See U.S. Pat. No. 5,376,818 to Kurtz, entitled "Large Area P-N Junction Devices Formed from Porous Silicon," issued on 27 Dec. 1994 and assigned to the assignee herein. That patent shows the formation of porous SiC, which is produced under electrochemical anodization. The patent teaches that when a potential is applied to the semiconductor and ultraviolet light illuminates the surface of semiconductor, one can control the light intensity, the potential in doping level, to form a microporous structure in the semiconductor, thus producing porous SiC. The microporous structure enhances the quantum confinement of energetic carriers, and the semiconductor device is highly sensitive to stress.

Reference is also made to U.S. Pat. No. 5,834,378 to Kurtz entitled, "Passivation of Porous Semiconductors for Improved Optoelectronic Device Performance and Fabrication of Light-Emitting Diode Bases on Same." The patent issued on 10 Nov. 1998 and is assigned to the assignee herein. That patent describes a method for improving the photoluminescent performance of a porous semiconductor. According to the patented method, a monolayer of passivating material is generated on a pore wall of the porous semiconductor to passivate the porous semiconductor. This monolayer substantially eliminates dangling bonds and surface states, which are associated with the porous semiconductor layer. The resulting passive porous semiconductor layer exhibits a quantum efficiency of approximately five percent. It is indicated that one monolayer of passivating material can be an oxide generated by placing the bulk semiconductor substrate into a furnace. Also described is a heterojunction light emitting device employing a passivated porous semiconductor layer.

U.S. Pat. No. 5,939,732, which issued on 17 Aug. 1999 and is entitled "Vertical Cavity Emitting Porous Silicon Carbide Light Emitting Diode Device and Preparation Thereof," is assigned to the assignee herein and invented by A. D. Kurtz et al. That patent teaches a multi-layered light emitting device, which has an active light emitting layer of porous silicon carbide and a sequence of layers of porous SiC underneath which serve as a quarter wavelength multi layer minor. In this manner, one obtains electroluminescent emission of narrow visible light in the deep blue to UV range in a highly directed pattern. Thus, as indicated above, the nanocrystallites in SiC give rise to an enlargement of the energy gap and shifts emitted light towards the UV region. The same effect has also been demonstrated in silicon. Moreover, when LEDs are made from such materials, the emitted light is shifted towards the UV, the shifting inversely proportional to the size of the nanostructure. It is well-known that the width of the energy gap may also be affected by the application of stresses (see for instance, deformation potentials). The use of deformation potentials as affecting the energy gap is well-known and is textbook material. Thus, it is indicated and known that the effect of stress can cause a change in the frequency of emitted light of an LED or the light resonance of the structure.

In graphite, a similar effect can occur. Normal graphite is a semi-metal, but in a nanostructure it can be a conductor or a semiconductor. For example, see an article entitled, "Nanotubes for Electronics" in the December 2000 issue of Scientific American, pages 62 to 69. This article describes nanotubes and is written by Phillip G. Collins and Phaedon Avouris. In the article, it is clear that nanotubes are utilized because of their unique electronic properties. Carbon nanotubes can be used to perform essentially the same function as silicon does in electronic circuits, but at a molecular scale, where silicon and other semiconductors do not work. In particular, when the dimensions of the nanotube are of the same order of magnitude as the electron wavelength, then these quantum effects can occur at those dimensions.

See also an article entitled "Cavity Quantum Electrodynamics" by Serge Haroche and Jean-Michel Raimond, which appeared in Scientific American in April 1993. This article explains the operation of atoms and photons and their behavior in small cavities. The article shows that new sensors can be developed utilizing such techniques.

In any event, because of the function and operation of nanotubes, it has been determined that application of stress can change a conductor to a semiconductor by changing the energy gap where the quantum confinement leads to a large change in the electrical properties. Essentially, the electrical properties of nanostructures, such as nanotubes, which exhibit quantum confinement, can be changed by the application of various stresses, thus leading to a means of measuring such stresses.

Given the above, it is well-known that there are many methods for measuring an applied force or stress. Historically, these measurements have been made using semiconductor based piezoresistive pressure transducers or strain gages, wherein a micromachined structure deflects under the load and results in the semiconductor material experiencing strain. The strain in the semiconductor material causes the electrical characteristics of the semiconductor to change, which in turn results in a change in the output signal of the device that is proportional to the applied force.

It is also known that a monolayer of graphite, also known as graphene, is a zero band gap semiconductor, and multilayers of graphene can be produced to create a small, controlled band gap. Similar to carbon nanotubes as demonstrated in U.S. Pat. No. 7,312,096, titled "Nanotube Semiconductor Structures with Varying Electrical Properties," which is assigned to the assignee herein, a monolayer or multilayers of graphene can exhibit a change in electrical properties when strained by an applied force.

Conventional sensors do not take full advantage of the various beneficial properties of nanotubes and graphene described above. Therefore, there is a need for sensors that effectively uses the above described beneficial properties of nanotubes and graphene.

SUMMARY

The present invention contemplates the formation of a high frequency, high temperature sensor, employing nanotubes or graphene subjected to pressure or other external conditions to vary the electrical properties of the nanotubes or graphene according to a desired application.

A transducer structure according to some embodiments of the present invention can comprise a substrate having nanotubes or graphene located on the substrate. Electrical properties of the transducer structure can vary with an applied force, and a means coupled to the nanotubes or graphene can provide an output based on the applied force, thereby enabling the structure to perform as a sensor.

The invention can use a single monolayer of graphene or several monolayers of graphene secured to a deflecting substrate. When the substrate and graphene are subjected to an applied force, the graphene can exhibit a change in its electrical properties, and the change in the electrical properties of the graphene can be proportional to the applied force. When strained, graphene can exhibit a change in its band gap that will result in a change in its resistance. This change in resistance with strain can be measured through a circuit connected to several monolayers of graphene or to a single monolayer. The circuit configuration could be a Wheatstone bridge or some other circuit design. The output signal from this circuit will be proportional to the applied force.

In some embodiments of the invention, metal contact pads can be introduced into the fabrication process of a nanotube transducer structure. The metal pads can connect the nanotubes together and secure the nanotubes to the substrate. In some embodiments, the metal pads can also be used to connect the nanotubes into a Wheatstone bridge configuration. Alternative embodiments can utilize the metal contact pads in a graphene transducer structure.

These and other features and advantages of the present invention will become apparent upon reading and understanding the present specification in conjunction with the accompanying drawings.

DETAILED DESCRIPTION

Figure 1:
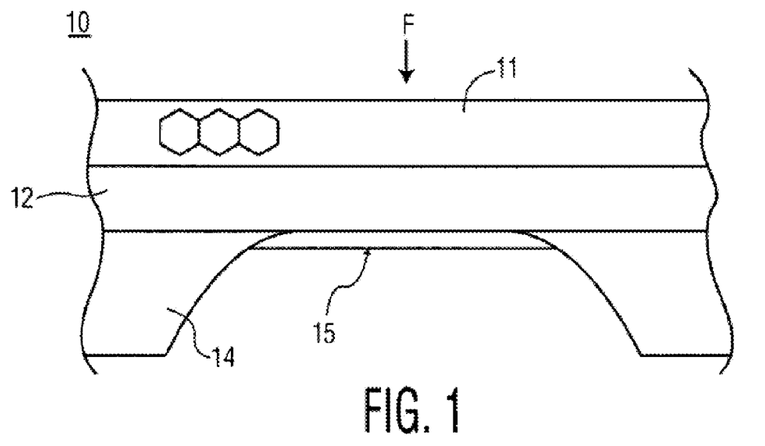
FIG. 1 illustrates a cross-sectional view of a nanotube sensor, according to an exemplary embodiment of the present invention.

Referring to FIG. 1, there is shown a cross-sectional view of a pressure sensor according to the present invention. Essentially, reference numeral 11 refers to a nanotube. The nanotube can consist of carbon atoms connected by $sp^2$ covalent bonds that form a cylindrical nanostructure. Carbon nanotubes can be metallic or semiconducting depending on the twist or chirality of the tube and the tube's diameter. There are straight nanotubes and twisted nanotubes. Essentially, the existence of nanotubes are well-known and one can determine how they are made and how they are developed by reference to the "Nanotubes for Electronics" article, which, as mentioned above, appeared in the December 2000 issue of Scientific America. While nanotubes are described, it is known that small tubes or pores can be fabricated in silicon, silicon dioxide, silicon nitride, silicon carbide, or other materials.

For example, the above-noted patents show how to make porous structures, such as porous silicon, porous silicon-nitride, and porous silicon-carbide. It is known to make micro-porous structures in such materials, including in graphite. Therefore, when one uses the word "nanotubes," one is talking also about porous materials or nanostructures. Nanostructures include extremely small pores. A significant characteristic of nanotubes is that the pore size in nanotubes is on the order of magnitude of the electron wavelength. Thus, the dimensions of the pores or the nanostructures are of the same order of magnitude as the electron wavelength and can accommodate quantum effects at these dimensions.

Therefore, while the present application describes carbon nanotubes, it is also known that nanostructures, which are extremely small structures, can be fabricated in bulk material, such as silicon, silicon-carbide, graphite, as well as other materials. See the above-noted patents for examples on how to do that. Therefore, the present invention also contemplates such nanostructures being fabricated as transducers where the substrate can be silicon or other materials and the material can be porous and therefore, the porous substrate will contain at least one nanotube structure, where the electronic properties of that structure will change with an applied force.

Additionally, as will be described in detail below, various aspects of the present invention also relate to graphene, which is a monolayer graphite. Graphene exhibits the same $sp^2$ bonding found in carbon nanotubes and can be thought of as an unrolled carbon nanotube. Graphene is a zero band gap semiconductor, and the present invention can involve one or more layers of graphene. Similar to carbon nanotubes, graphene can exhibit a change in its electrical properties when strained by an applied force.

It is well-known that carbon nanotubes do not have the same band gap because for every circumference and chirality, there is a different state of valance and conduction states. As one can ascertain, it is an objective of the present invention to subject the nanotube to a force or stress and, based on the amount of stress imported to the nanotube, one can change the electrical properties of the nanotube and thus, provide a sensor device. A nanotube can be formed in many different ways.

As indicated, scientists have constructed field effect transistors (FETs) using semiconducting nanotubes formed between two metal electrodes. The nanotubes act as a channel through which electrons flow. The current flowing in the channel is switched on and off by applying voltages to a third electrode. Such devices operate at room temperature, with electrical characteristics that are reminiscent of silicon. In the article, it is also indicated clearly that semiconducting nanotubes change their electrical resistance dramatically when exposed to alkalis, halogens and other gases at room temperature.

As indicated, nanotubes are sensitive to different chemicals, such as oxygen and water and they may be able to distinguish one chemical or gas from another. It is a present object of the invention, as shown in FIG. 1, to dispose a plurality of nanotubes 11, whether straight or twisted, on the surface of a support substrate 12. The support surface 12 can be, for example, silicon, metal, silicon carbide or some other material. The nanostructures can be supported by the substrate 12 along their entire lengths or can be in contact with the top surface of the substrate 12 along their entire lengths. The substrate surface 12 is bonded to a support layer 14, which may be fabricated from glass, silicon or some other material. As seen, there is depicted an active area 15. When a force is applied to the nanotube 11, as indicated by arrow designated as F, the nanotube 11 changes its electrical characteristics. If the nanotube is in part of a circuit, such as a Wheatstone Bridge arrangement, then the output of the Bridge will change according to the changed electrical characteristics of the nanotube 11 and according to the applied force. In this manner, one can obtain a sensor where the output voltage of the sensor is a function of the applied force F.

Figure 2:
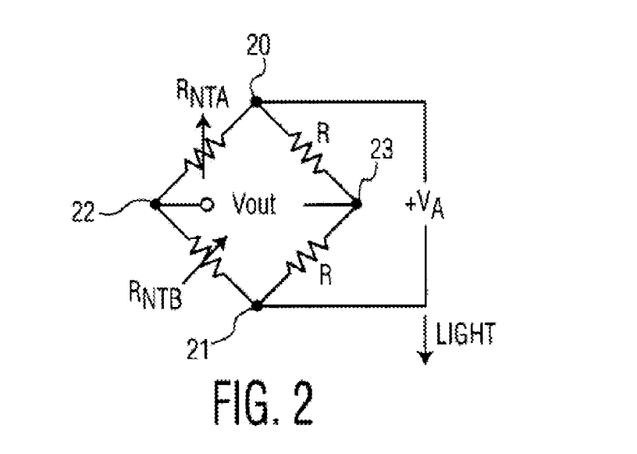
FIG. 2 illustrates a circuit schematic of the Wheatstone Bridge employing a nanotube sensor, according to an exemplary embodiment of the present invention.

FIG. 2 shows a circuit diagram of a Wheatstone Bridge. A Wheatstone Bridge is a very conventional and well-known circuit. As seen in FIG. 2, two nanotubes designated as $R_{NTA}$ and $R_{NTB}$ are arranged in one arm of the Bridge, while the other arm of the Bridge may consist of two fixed resistors. A voltage ($V_A$) is applied to the two terminals 20 and 21 of the Bridge, while the output voltage ($V_{OUT}$) is taken between terminals 22 and 23. While the circuit shows a typical and well-known Wheatstone Bridge configuration, as indicated, one may employ only a single nanotube sensor in the arrangement or multiple nanotube sensors. Many different configurations are known and anticipated.

Referring back to FIG. 1, it is understood, that the nanotube 11, as indicated above, is formed by graphite and there are many techniques well-known for providing nanotubes. The substrate layer 12 can be silicon carbide, silicon dioxide, silicon, metal, carbon or, for example, silicon nitride. The support layer 14 may also be fabricated from any of the above-noted materials. It is seen that the main reasons for layers 12 and 14 is to support the nanotube to enable it to receive an applied stress and to therefore, respond accordingly. It is also known that the nanotubes can be utilized in beam type transducers and other transducer configurations. It is also understood that the structure of FIG. 1 can be utilized to detect various chemicals due to the change in the electrical properties of the nanotube when exposed to chemicals.

Therefore, the nanotube or sensor of FIG. 1 can be arranged in the Wheatstone Bridge configuration of FIG. 2. The Bridge will produce a different voltage output for the presence of various different substances, such as water, oxygen and various other chemicals, such as hydrogen sulfide or poisonous chemicals.

Figure 3:
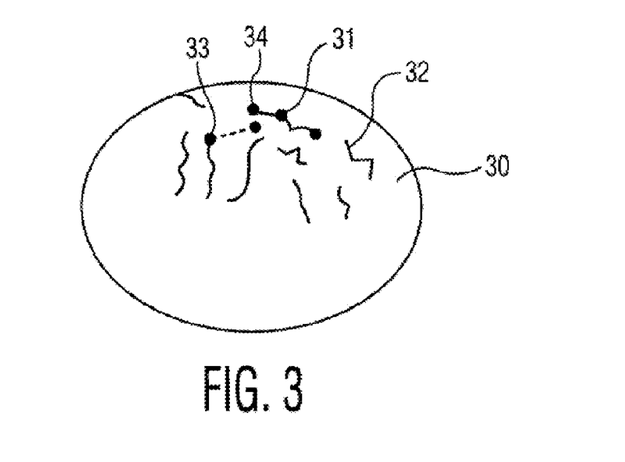
FIG. 3 illustrates a top plan view showing a substrate with a plurality of nanotubes deposited thereon, according to an exemplary embodiment of the present invention.

Referring to FIG. 3, there is shown a top plan view of a substrate 30 having located and positioned on a top surface a plurality of nanotubes, such as 31, 32, 33, and 34. Essentially, as one can ascertain from the prior art, the fabrications of nanotubes are well-known. Nanotubes can be fabricated by utilizing a tube of graphite rods, which are placed millimeters apart and connected to a power supply. When the power is connected between the rods, a large current flows and the carbon located on the rods vaporizes into a hot plasma. The plasma recondenses in the form of nanotubes. Another technique is called "chemical vapor deposition" or CVD. In this technique, a substrate is placed in an oven and heated to a high temperature, as for example, 850 degrees C. A carbon-bearing gas, such as methane, is slowly added, and as the gas dissociates, it frees up carbon atoms, which combine in the form of nanotubes. Another technique is to use a laser to impinge on graphite rods, and based on the intense laser pulses, carbon nanotubes are generated.

As one can ascertain, the nanotubes are conventional and can be easily made. As shown in FIG. 3, the nanotubes, such as 31 and 32, can be secured to the substrate. The substrate 30 can be, for example, silicon, silicon dioxide, silicon carbide, silicon nitride, or a metal substrate coated with an insulating material to provide isolation of the nanotube such as 31, 32, and 33 from the substrate. As indicated, the substrate is shown as reference numeral 12 in FIG. 1 and is reference numeral 30 in FIG. 3. Transferring the nanotubes to the substrate can be performed through many conventional techniques, including brushing the nanotubes onto the substrate by applying a paste of nanotubes to the surface of the substrate, or transferring the nanotubes onto the substrate 30 in a similar manner as described for transferring graphene with reference to FIGS. 7A-C.

In such deposition methods, the nanotubes are conventionally secured to the substrate by only Van der Waals forces, which are attractive forces between the atoms in the nanotube and those in the surface of the substrate. If the nanotubes are later exposed to an external force, however, Van der Waals forces may not be sufficient to keep the nanotubes secured to the substrate. Therefore, it is desirable to further secure the nanotubes to the substrate. According to some embodiments of the present invention, the nanotubes can be further secured to the substrate through the use of metal contact pads, which in some embodiments, can be applied after controlling nanotube orientation during the growth deposition process.

Figure 4:
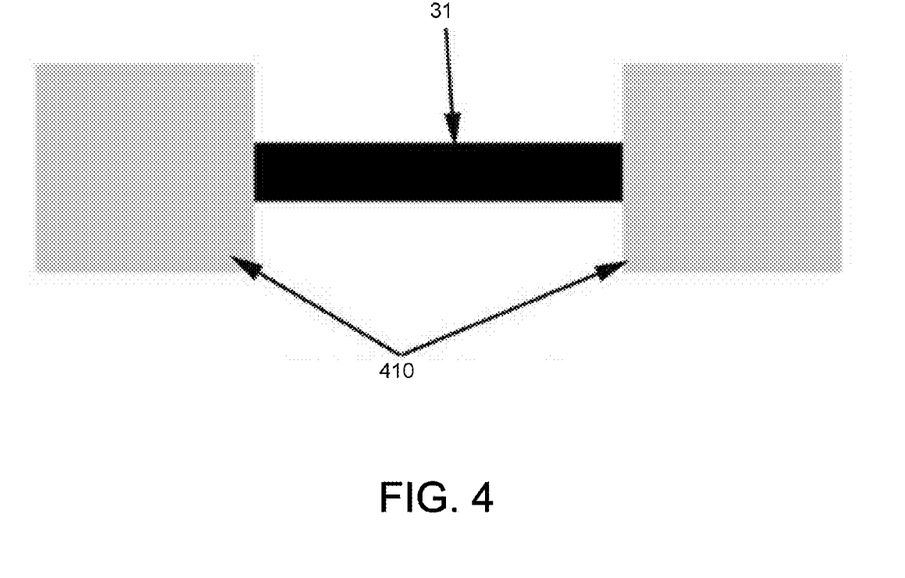
FIG. 4 illustrates a transducer structure having metal contact pads securing nanotubes to a substrate, according to an exemplary embodiment of the present invention.

As illustrated in FIG. 4, metal contact pads 410 can be introduced into the fabrication process of the nanotube transducer structure. The metal pads 410 can connect the nanotubes together and secure the nanotubes, such as nanotube 31, to the substrate 30. The metal pads 410 can also be used to connect the nanotubes 31 into a Wheatstone bridge configuration. In some embodiments, metal interconnects can be used in combination with the metal contact pads 410 to form the bridge circuit.

The metal pads securing the nanotubes to the substrate and connecting them can be fabricated using standard semiconductor fabrication processes, including but not limited to optical photolithography or an electron beam lithography machine. In these fabrication processes, photoresist can be deposited onto the nanotubes on the silicon, silicon dioxide, or other substrate. The photoresist can then be exposed in selected regions to either ultraviolet light in the case of optical photolithography or the electron beam when an electron beam lithography machine is used. The photoresist can then be developed, and metal can be deposited onto the substrate by thermal evaporation, electron beam evaporation, sputtering, or another technique. The undesired photoresist and metal can be chemically removed, leaving the nanotubes on the substrate secured by metal pads. The metal pads can secure the nanotubes to the substrate and can additionally be used to connect nanotubes into a Wheatstone bridge configuration.

In some further embodiments, nanotube orientation can be controlled during the growth deposition process by the chemical vapor deposition or by alignment methods. The orientation of the nanotubes will enable optimization of the piezoresistance effect in the sensor. Carbon nanotubes can be oriented during the chemical vapor deposition process by varying the substrate on which the nanotubes are grown, the catalyst, the catalyst deposition process, or some other aspect of the growth. For example, nanotubes can be grown via chemical vapor deposition in straight lines by using an atomically aligned substrate with a catalyst. The nanotubes will grow parallel to the flow of the carbon barring gas along the aligned crystallographic structure of the substrate. Metal contact pads can then be deposited onto the oriented nanotubes as described above.

As one can ascertain, there are a plurality of nanotubes disposed on the surface of the substrate 30. The composition and geometry of nanotubes have desirable electronic characteristics that vary with strain. However, only some carbon nanotubes combine the appropriate diameter and degree of twists to enable them to act as semiconductors. As a result, many of the nanotubes, as shown in FIG. 3, are not semiconductors, but are metallic nanowires. A nanowire is a good conductor, but has extremely low resistivity. Therefore, the nanotube semiconductor devices do not pass current easily without an additional boost of energy. For example, one can use a light beam or a voltage to cause electrons to leave the valance states and move into conducting states. The amount of energy needed depends on a separation between the valance and conducting states and is the band gap.

Carbon nanotubes do not all have the same band gap as one another, because for every circumference and chirality, there is a different set of valances and conduction states. According to one aspect of this invention, one selects those nanotubes which are semiconductor tubes, such as, for example, 31 and 33 and one then connects those nanotubes by means of a wire or by means of a conductive nanotube, such as 34, to form an elongated series resistor of nanotubes. This resistor or nanotube, as indicated in regard to FIG. 1, will change its electrical characteristics based on the application of force. This is also seen, in FIG. 3, that one can apply light to the device when one wishes the device to act as a semiconductor, and therefore, the combination of both light and force or either causes the carbon nanotube resistor to change electrical characteristics.

As one can ascertain, it is well-known to connect nanotubes together. Nanotubes can be made to grow specifically on the substrate or other places by controlled growth. Scientists at Stanford University and other universities have demonstrated that by placing spots of nickel, iron, cobalt, or some other catalyst on the substrate 30, they can grow nanotubes in predetermined places. Thus, as seen in FIG. 3, the semiconductor nanotubes 31, 32 and 33 can be connected together by means of wire nanotubes 34 or other techniques. Nanotubes can be connected together with silicon nanowires and, therefore, can be connected to form the Wheatstone Bridge as, for example, shown in FIG. 2.

Figure 5:
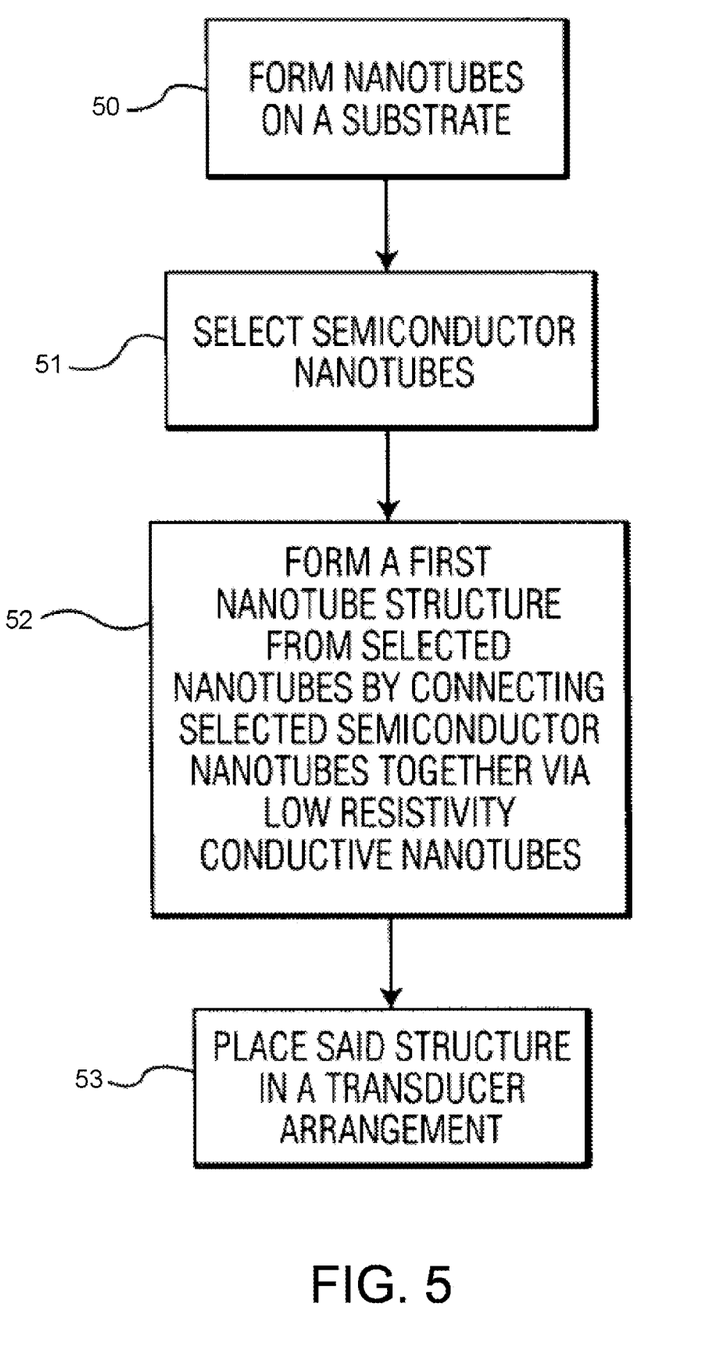
FIG. 5 illustrates a flow diagram showing a method for utilizing nanotubes in a semiconductor structure, according to an exemplary embodiment of the present invention.

Referring to FIG. 5, there is shown a method according to this invention. Step 50 indicates that one forms or places nanotubes on a conventional substrate as indicated, for example, in FIG. 3. The substrate may be various materials, such as silicon, silicon carbide, metal, carbon, or the like. The nanotubes can be placed on the substrate by mixing the nanotubes into a composite paste or plastic. The mixed nanotubes in plastic are then painted or otherwise applied to the substrate. Of the nanotubes applied to the substrate, certain of the nanotubes can be wires, while others are semiconductors. In the step depicted by numeral 51, one selects the semiconductor nanotubes as, for example, shown in FIG. 3, as 31 and 32. One then connects these nanotubes together by utilizing wire nanotubes or silicon wires to form a first nanotube structure, which essentially is a resistive structure of a desired resistance. This structure is formed from selected nanotubes, as indicated in step 52. One then places the formed nanotube structure in a transducer arrangement as shown by reference numeral 53. In this manner, the first plurality of nanotubes is selected on the substrate as semiconductors, and they are connected together to form a first nanotube resistance or first nanotube structure.

In a similar manner, other pluralities of nanotubes may be connected together to form another resistive structure. Alternatively, it is understood that one can connect a first plurality of nanotubes one to the other, including both semiconductor nanotubes and wire nanotubes. If one connects a wire nanotube in series with two semiconductor nanotubes, one still has a semiconductor nanotube. In this manner, relatively large resistance values can be obtained. The large resistance values can provide sensitive bridge elements.

When a stress or force is applied to the surface of the substrate, the nanotubes will deflect and respond accordingly, and therefore, the current through the nanotube will change according to the applied force. Accordingly, a nanotube transducer structure can be used in a bridge circuit or various other circuit configurations to determine the magnitude of a force or stress applied to the structure As an alternative to using nanotubes to detect an applied force, the present invention can use graphene in a graphene transducer structure. A single monolayer of graphene, or several monolayers of graphene, can be secured to the deflecting substrate 30 to detect an applied force or stress. When the substrate 30 and graphene are subjected to the applied force, the graphene will exhibit a significant change in its electrical properties. The change in the electrical properties of the graphene will be proportional to the applied force. When strained, graphene can exhibit a change in its band gap that will result in a change in its resistance. This change in resistance with strain can be measured through a circuit connected to the graphene. The circuit configuration can be a Wheatstone bridge or some other circuit design, and the output signal from this circuit will be proportional to the applied force.

Figure 6A:
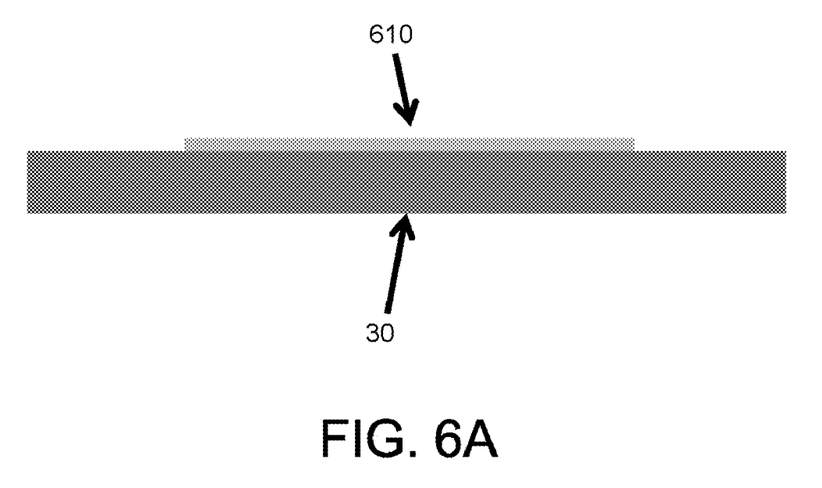
FIGS. 6A-B illustrate steps of growing graphene on a substrate by chemical vapor deposition, according to an exemplary embodiment of the present invention.
Figure 6B:
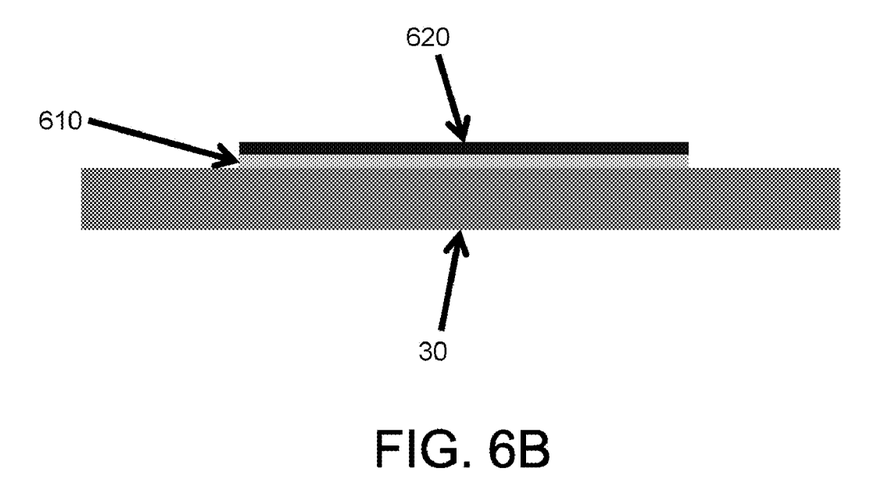

As with nanotubes in the nanotube sensor described above, graphene can be grown on the substrate 30 by chemical vapor deposition. FIGS. 6A-B illustrate steps in the chemical vapor deposition process. Chemical vapor deposition involves a catalyst material 610, shown in FIGS. 6A-B, and a carbon bearing gas. As shown in FIG. 6A, the catalyst 610 is deposited on the substrate 30 in the desired location of growth. The carbon bearing gas is brought to elevated temperatures such that the gas disassociates. When flowing over the substrate 30, the free carbon atoms attach to the catalyst 610 and form graphene 620, which is shown in FIG. 6B.

An alternative process to achieve graphene formation is micromechanical cleavage of bulk graphite. In this process, bulk graphite is cleaved with tape or some other material. The tape is then stuck onto a silicon dioxide or some other material substrate and slowly removed. After the tape is removed, some graphene will remain secured to the surface of the substrate by Van der Waals forces. The graphene can then be identified and located with an optical microscope.

Figure 7A:
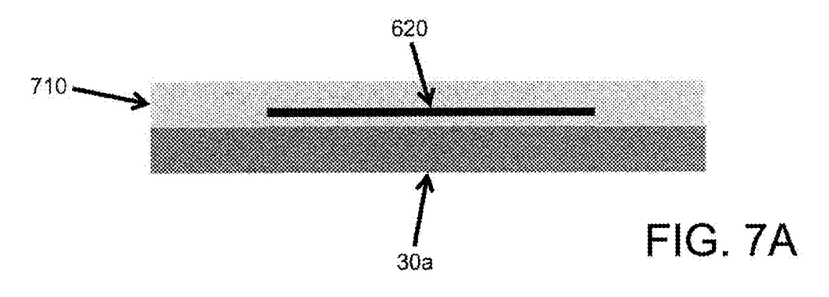
FIGS. 7A-C illustrate steps of transferring graphene to a second substrate after fabrication of the graphene on a first substrate, according to an exemplary embodiment of the present invention.
Figure 7B:
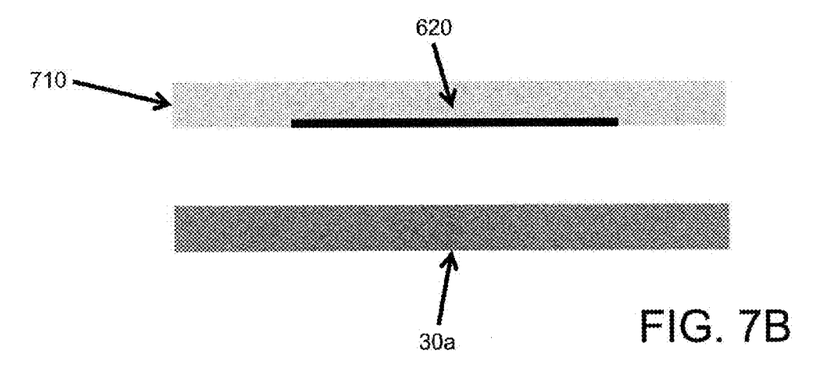
Figure 7C:
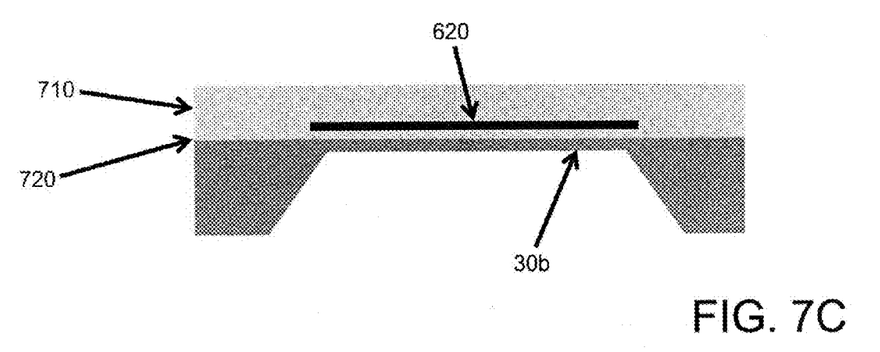

After its fabrication by chemical vapor deposition, mechanical cleavage, or another means, graphene can be located and transferred to a different substrate if necessary. FIGS. 7A-C illustrate steps of transferring graphene 620 to a second substrate 30b after its fabrication on a first substrate 30a. As shown in FIG. 7A, graphene 620 transfer can be achieved by coating the graphene 620 and original substrate 30a in a photoresist 710, such as PMMA (polymethyl methacrylate). The photoresist 710 and graphene 620 can then be lifted off of the substrate 30a in a chemical bath, as shown in FIG. 7B. The graphene-photoresist layer, consisting of the graphene 620 and the photoresist 710, can then be directly transferred by sliding the graphene-photoresist layer onto the new substrate 30b, as shown in FIG. 7C. In FIG. 7C, an insulating layer 720 lies between the graphene-photoresist layer and the new substrate 30b, but this is not required in all embodiments of the invention.

Figure 8:
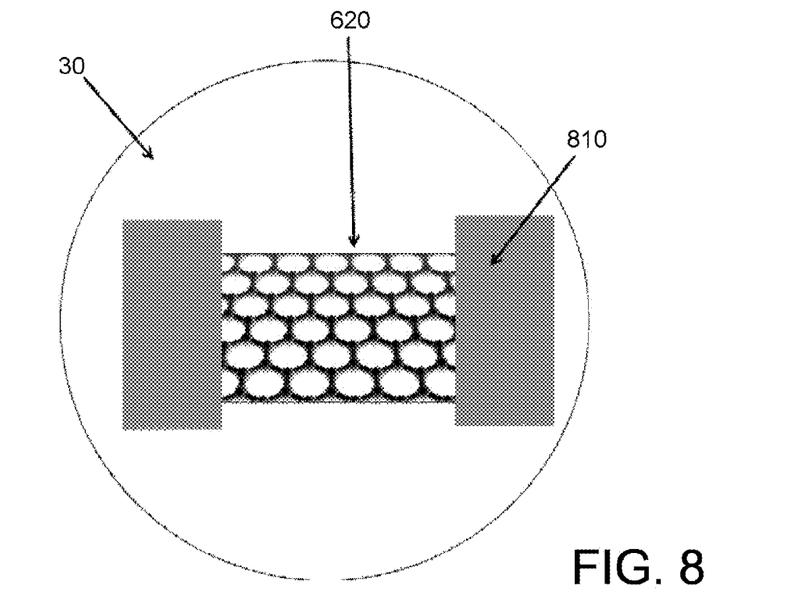
FIG. 8 illustrates a top view of graphene secured to an insulating substrate with metal contact pads, according to an exemplary embodiment of the present invention.
Figure 9:
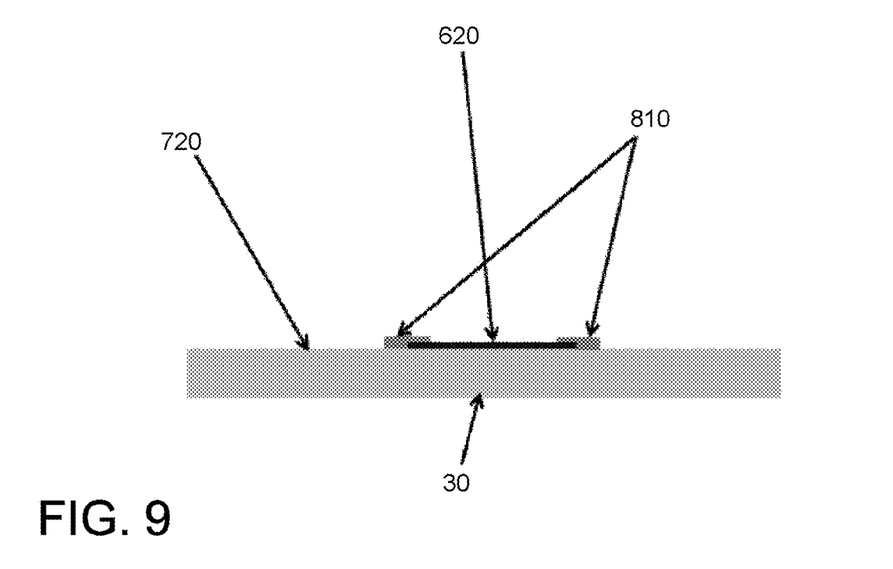
FIG. 9 illustrates a side view of graphene secured to the insulating substrate with metal contact pads, according to an exemplary embodiment of the present invention.

Graphene 620 can be transferred or originally fabricated into various transducer structures. After the graphene 620 is fabricated on or transferred to the desired substrate 30, metal contact pads can be selectively deposited onto the edges of the graphene. FIGS. 8-9 respectively provide a top and side view of a sensing layer of graphene 620 secured to an insulating layer 720 with metal contact pads 810. The metal pads 810 can serve two functions: first, to further secure the graphene 620 to the substrate 30 and, second, to act as electrical connections in the formation of a Wheatstone Bridge circuit or some other circuit. In some embodiments, metal interconnects can be used in combination with the metal contact pads 810 to form the circuit. As described above in reference to the use of metal contacts with nanotube transducer structures, deposition of the metal contact pads 810 can occur through various means, such as optical photolithography, electron beam lithography, or some other semiconductor fabrication technique, along with thermal metal evaporation, electron beam evaporation, or metal sputtering.

Figure 10A:
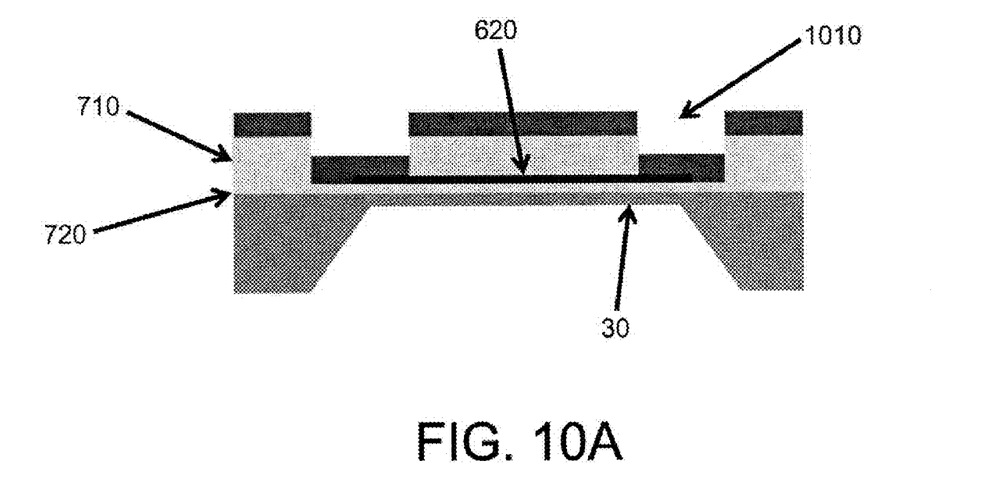
FIGS. 10A-B illustrate steps of fabricating metal contact pads for a transducer structure, according to an exemplary embodiment of the present invention.
Figure 10B:
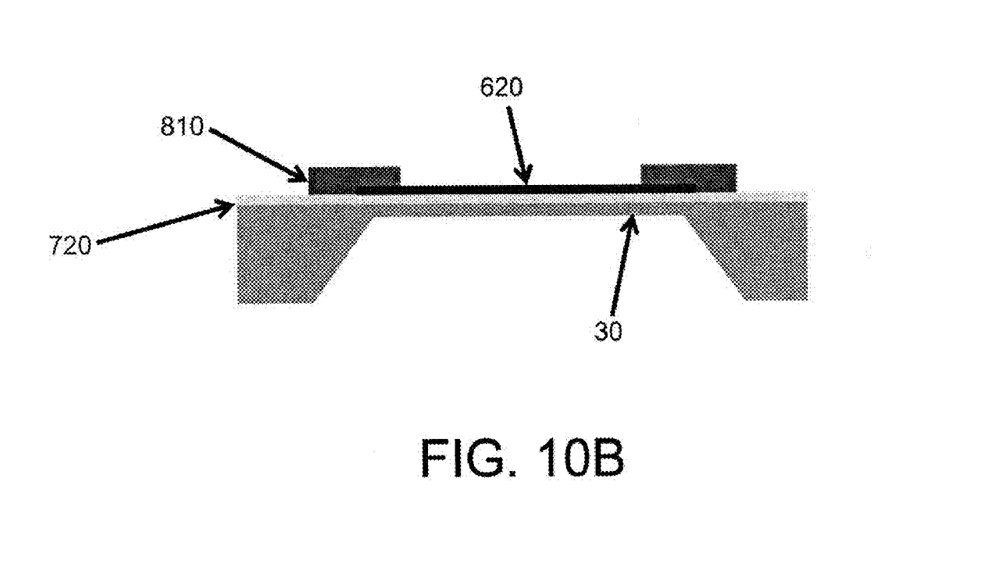

FIGS. 10A-B illustrate various steps of an exemplary method of fabricating the metal pads 810 for the transducer structure. The metal pads 810 securing the graphene to the substrate 30 and connecting the graphene can be fabricated using standard semiconductor fabrication processes, including but not limited to optical photolithography or an electron beam lithography machine. In these fabrication processes, photoresist can be deposited onto the graphene 620 on the silicon, silicon dioxide, or other substrate 30. The photoresist 710 can then be exposed in selected regions to either ultraviolet light in the case of optical photolithography or the electron beam when an electron beam lithography machine is used. The photoresist 710 can then be developed, and as illustrated in FIG. 10A, metal 1010 can be deposited onto the substrate 30 by thermal evaporation, electron beam evaporation, sputtering, or another technique. The undesired photoresist 710 and metal 1010 can be chemically removed, leaving the graphene 620 on the substrate 30 secured by metal pads 810, as shown in FIG. 10B. The metal pads 810 can secure the graphene 620 to the substrate 30 and can additionally be used to connect the graphene 620 into a Wheatstone bridge configuration. The method illustrated in FIGS. 10A-B can also apply to deposition of the metal pads 810 for nanotube transducer structures.

Figure 11:
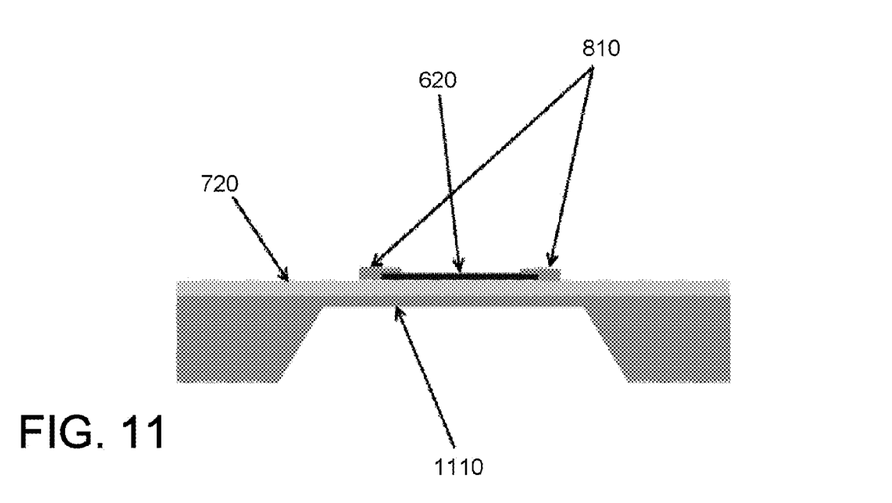
FIG. 11 illustrates a cross-sectional side view of a graphene pressure transducer, according to an exemplary embodiment of the present invention.

Once the graphene 620 sensing layer is fabricated, additional processing is performed to produce a graphene transducer. FIG. 11 illustrates a cross-sectional side view of a graphene-based pressure transducer, according to an exemplary embodiment of the present invention. In the illustrated configuration, a deflecting diaphragm 1110, which is micromachined from silicon or some other material, is bonded to the backside of the electrically insulating substrate 30 on which the graphene 620 is secured. When exposed to a force, the diaphragm 1110 deflects, causing the graphene 620 to experience strain. The strain changes the energy gap of the graphene 620 thereby altering the graphene's electrical properties. These strain-induced changes in the electrical properties of the graphene 620 can be measured through the output signal of a circuit and will be proportional to the applied force.

Figure 12:
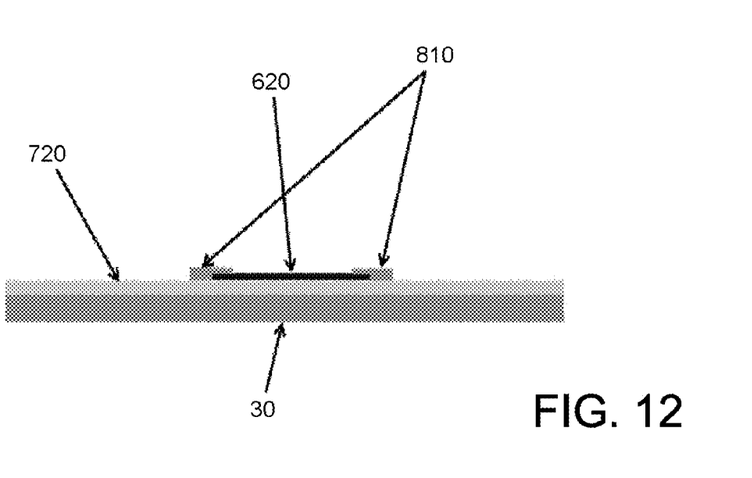
FIG. 12 illustrates a cross-sectional side view of a graphene-based strain gage device, according to an exemplary embodiment of the present invention.

Graphene can similarly be implemented as the semiconductor material in a strain gage transducer structure, as illustrated in FIG. 12, which shows a cross-sectional side view of a graphene-based strain gage device. In this configuration, the graphene 620 is again grown via chemical vapor deposition, micromechanically cleaved directly onto the desired insulating substrate 30, or transferred onto the substrate 30, as discussed above. Metal contact pads 810 can similarly be deposited onto the graphene 620 to secure it to the substrate 30 and function as electrical contacts to the semiconductor material. In this transducer structure, the graphene 620 on top of the insulating substrate 30 is then attached to a flat polymer, metal, silicon, or some other material acting as a bottom layer of the device. This bottom layer can then be attached to a region where it is desired to measure compressive or tensile strain. As the entire device is strained, the graphene 620 exhibits a change in its electrical properties that can be measured through an output signal.

Figure 13:
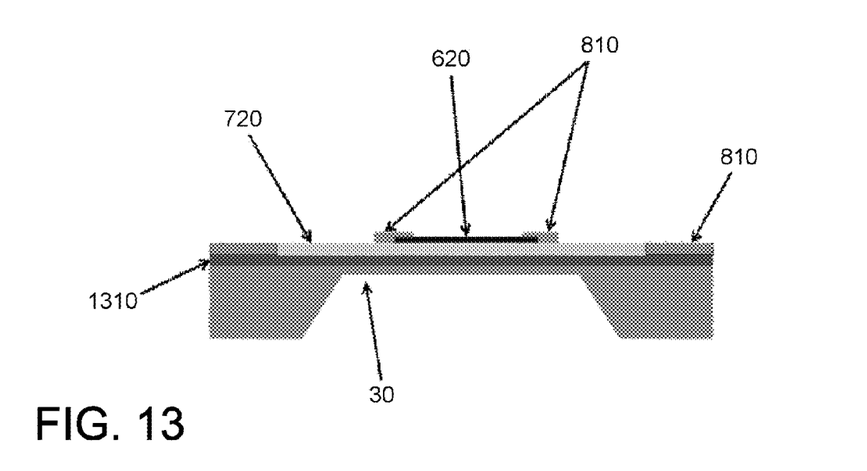
FIG. 13 illustrates a cross-sectional side view of the graphene pressure transducer with an additional conductive layer, according to an exemplary embodiment of the present invention.
Figure 14:
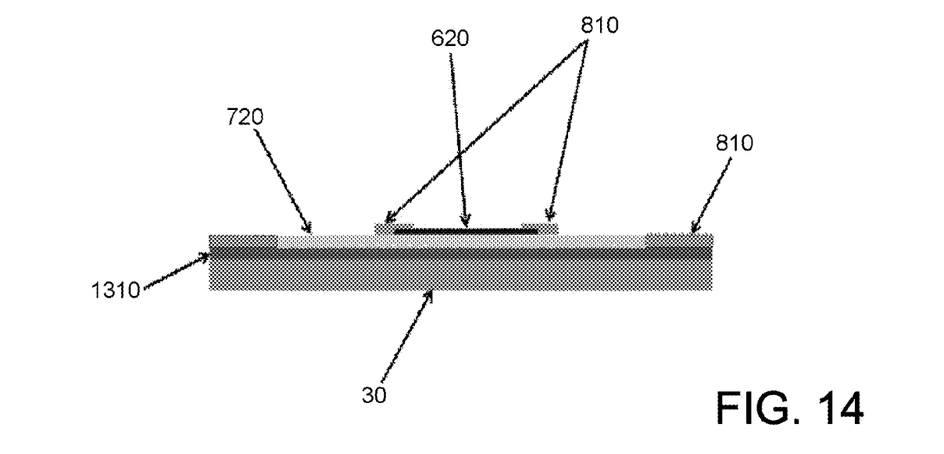
FIG. 14 illustrates a cross-sectional side view of the graphene-based strain gage device with an additional conductive layer, according to an exemplary embodiment of the present invention.

An additional conductive layer, or electrical contact pad, can be used under the insulating substrate layer 30 in some graphene-based transducer structures. FIGS. 13-14 provide cross-sectional side views of, respectively, a graphene-based pressure sensor and a graphene-based strain gage with such an underlying conductive layer 1310. In both transducer structures, this additional conductive layer 1310 can be used to adjust the carrier concentration in the graphene 620 by applying a voltage bias. Adjusting the carrier concentration of the graphene 620 with a minimal gate voltage while the graphene 620 is exposed to an applied force can change the graphene's sensitivity to the applied force. The additional conductive biasing layer 1310 can be thought of as a "gate." While use of such a gate 1310 may not be necessary in all applications, it may be useful in some instances.

When a stress or force is applied to the surface of the substrate, the graphene will deflect and respond accordingly, and therefore, the current through the graphene will change according to the applied force. Accordingly, like a nanotube transducer structure, a graphene transducer structure can be used in a bridge circuit or various other circuit configurations to determine the magnitude of a force or stress applied to the structure While various exemplary embodiments of transducer structures have been disclosed and illustrated, many modifications, additions, and deletions can be made to the transducer structures without departing from the spirit and scope of the present invention and its equivalents, as set forth in the following claims.

What is claimed is:

1. A transducer comprising:
   a substrate
   a plurality of graphene semiconductive structures located entirely on a surface of the substrate, each of the graphene semiconductive structures being supported along its entire length by the substrate, wherein an electrical property of the graphene semiconductive structures changes with an applied force;
   one or more metal pads securing at least one of the graphene semiconductive structures to the substrate; and
   a circuit coupled to at least some of the graphene semiconductive structures to provide an output responsive to the change in the electrical property, the output being indicative of the applied force.

2. The transducer of claim 1, the plurality of graphene semiconductive structures being multilayer graphene having controlled band gaps.

3. The transducer of claim 1, the metal pads connecting the graphene semiconductive structures into a Wheatstone Bridge configuration.

4. The transducer of claim 1, the metal pads being deposited on the substrate by thermal evaporation, electron beam evaporation, or sputtering.

5. The transducer of claim 1, the plurality of graphene semiconductive structures being arranged in a predetermined orientation and location.

6. The transducer of claim 5, the arrangement of the graphene semiconductive structures optimizing a piezoresistive effect of the transducer.

7. The transducer of claim 1, the applied force changing the resistance of at least some of the plurality of graphene semiconductive structures.

8. A transducer comprising:
   a substrate;
   a plurality of structures on a surface of the substrate, the plurality of structures having varying electrical properties, wherein an electrical property of the structures changes with a predetermined external condition, and wherein at least two of the structures are connected to each other by a conductive material to form a bridge circuit; and
   one or more metal pads securing at least one of the plurality of structures to the surface of the substrate and forming an electrical connection to the at least one of the plurality of structures;
   wherein the predetermined external condition causes a predictable change in current through the bridge circuit; and
   wherein the structures comprise nanotubes or graphene.

9. The transducer of claim 8, the predetermined external condition being an application of force to the substrate.

10. The transducer of claim 9, the applied force providing adequate energy to bridge the band gap of at least some of the semiconductive structures.

11. The transducer of claim 8, the predetermined external condition being the presence of a chemical in the environment.

12. The transducer of claim 8, the plurality of structures comprising nanotubes selected from silicon, silicon dioxide, silicon nitride, silicon carbide, carbon, or combinations thereof.

13. The transducer of claim 8, at least some of the plurality of structures being grown via chemical vapor deposition in an atomically aligned substrate.

14. The transducer of claim 8, further comprising an electrical contact located underneath the substrate, the electrical contact enabling application of a bias to at least a portion of the plurality of structures.

* * * * *